United States Patent [19]

Bloch et al.

[11] Patent Number: 4,551,954
[45] Date of Patent: Nov. 12, 1985

[54] METHOD FOR CONTROLLING A GRINDING STROKE IN A GEAR TOOTH FLANK GRINDING MACHINE

[75] Inventors: Peter Bloch, Mutschellen; Robert Wydler, Zürich, both of Switzerland

[73] Assignee: Maag Gear-Wheel & Machine Company Limited, Zürich, Switzerland

[21] Appl. No.: 586,327

[22] Filed: Mar. 5, 1984

[30] Foreign Application Priority Data

Mar. 11, 1983 [CH] Switzerland ............... 1338/83

[51] Int. Cl.⁴ .............................................. B24B 55/02
[52] U.S. Cl. .................................. 51/287; 51/165.87; 51/34 R; 51/134.5 R
[58] Field of Search ............... 51/134.5 R, 34 R, 287, 51/165.87, 42

[56] References Cited

U.S. PATENT DOCUMENTS

| | | | |
|---|---|---|---|
| 3,753,319 | 8/1973 | Mesey | 51/42 |
| 3,763,598 | 10/1973 | Hofler | 51/287 X |
| 3,916,569 | 11/1975 | Wydler et al. | 51/287 X |
| 4,142,333 | 3/1979 | Fivian | 51/287 |
| 4,393,625 | 7/1983 | Bloch et al. | 51/165.87 |

FOREIGN PATENT DOCUMENTS 1552761  9/1971  Fed. Rep. of Germany .

Primary Examiner—James G. Smith
Assistant Examiner—Debra S. Meislin
Attorney, Agent, or Firm—Werner W. Kleeman

[57] ABSTRACT

In a gear tooth flank grinding machine operating on the indexing generating principle, a pair of dished grinding wheels is moved back and forth along the generatrices of involute gear tooth flanks, the grinding stroke being longer than the length of the generatrices by the amount of a supplemental dimension. The effective radius of at least one grinding wheel is measured at least once during the machining of each gear tooth flank and the grinding stroke is reduced in correspondence to the gradual reduction of the measured radius.

6 Claims, 14 Drawing Figures

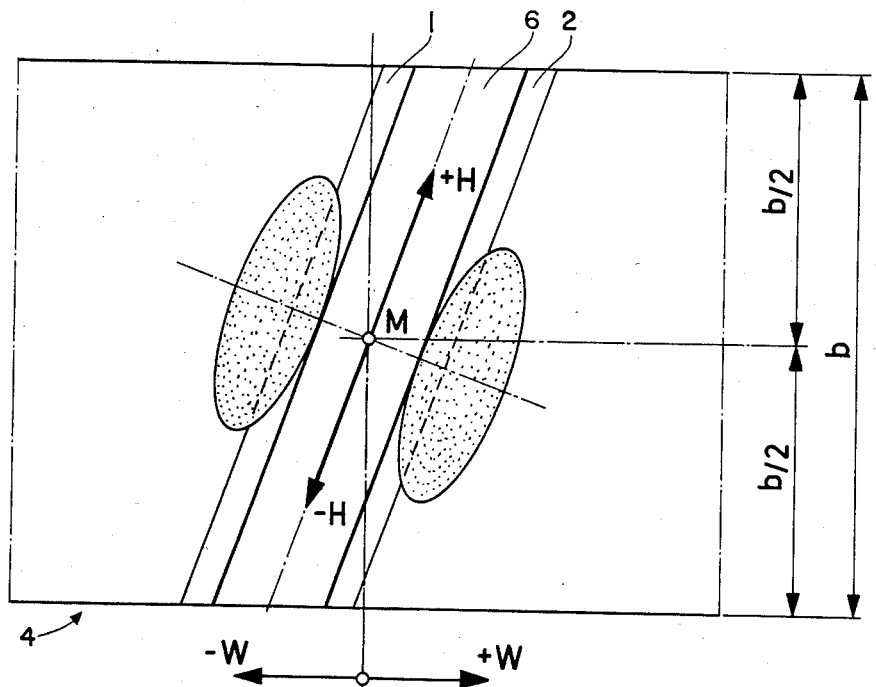
Fig. 1a
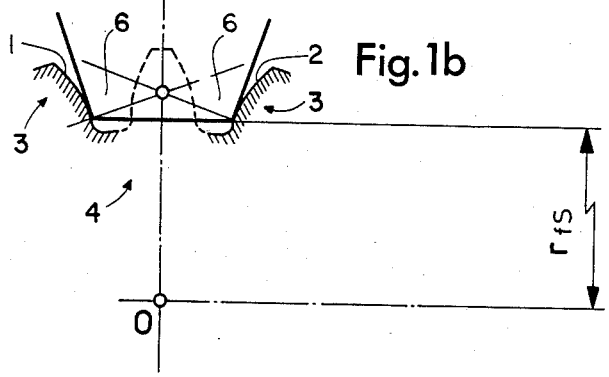
Fig. 1b
Fig. 2
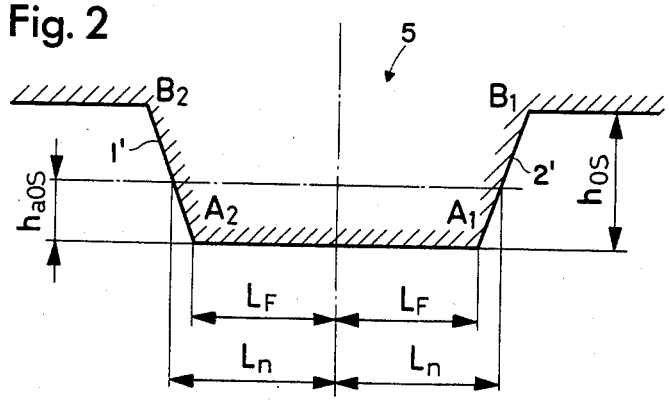

METHOD FOR CONTROLLING A GRINDING STROKE IN A GEAR TOOTH FLANK GRINDING MACHINE

BACKGROUND OF THE INVENTION

The present invention broadly relates to a method of grinding gear teeth and, more specifically, pertains to a new and improved method of controlling the grinding stroke in a gear tooth flank grinding machine.

Generally speaking, the method of the present invention controls the grinding stroke or path length in relation to the generating path or travel of a gear tooth flank grinding machine operating on the indexing generating principle and having at least one dished or conical grinding wheel reciprocatably movable along involute gear tooth flanks.

More specifically, the method of the present invention controls a grinding stroke H of a gear tooth flank grinding machine operating on the indexing generating principle and having at least one dished or concave grinding wheel with an active radius $R_S$ reciprocatably moveable in grinding strokes along generatrices of involute gear tooth flanks to perform a machining of each gear tooth flank and wherein the grinding stroke H is greater than lengths of the generatrices by the amount of a supplemental dimension.

When machining involute gear tooth flanks, especially on helical gears, a grinding operation is carried out along the generatrices which extend over variable lengths in the width of the gear tooth; it is therefore advantageous to control the grinding stroke in relation to the functionally required lengths in order to avoid unnecessarily great over-runs of the grinding wheels. Such over-runs represent idle time for the grinding machine in which no work is performed on the gear blank.

It is known from U.S. Pat. No. 3,753,319, granted Aug. 21, 1973, to define a parallelogramatic grinding stroke zone in relation to the helix angle of the gear teeth to be cut by means of stop abutment rails which, at least to a rough approximation, corresponds to the varying required grinding stroke lengths. The stop abutment rails are empirically adjusted at the beginning of the grinding operation on a gear or a series of gears; once the rails have been adjusted it is not possible to change them during the grinding operation and the geometrical possibilities presented by the form of the gear tooth flanks in individual cases cannot be fully exploited.

Furthermore, the diameter of the grinding wheels have hitherto been regarded as constant during the entire machining operation for the purposes of controlling the length of the grinding stroke, even through grinding wheels which are employed for grinding large gears, have, when new, a diameter of from 500 to 700 millimeters and which wears down to a diameter of from 250 to 300 millimeters. In failing to adapt the control of the grinding stroke length to the decreasing diameter of the grinding wheels, considerable portions of the operating time of the grinding machine are wasted.

SUMMARY OF THE INVENTION

Therefore, with the foregoing in mind, it is a primary object of the invention to provide a new and improved method of controlling the grinding stroke in an indexing generating gear grinder which does not have associated with it the aforementioned drawbacks and shortcomings of the prior art methods.

Another and more specific object of the present invention aims at providing a new and improved method for controlling a grinding stroke of a gear tooth flank grinding machine operated on the indexing generating principle in relation to the generation path or travel such that idle time due to unnecessarily excessive grinding wheel over-run is further reduced.

Yet a further significant object of the present invention aims at providing a new and improved method of controlling a grinding stroke of the character described which is relatively simple in concept and execution, extremely economical to implement, highly reliable in operation, not readily subject to breakdown or malfunction and requires a minimum of maintenance and servicing.

Now in order to implement these and still further objects of the invention, which will become more readily apparent as the description proceeds, the method of the present invention is manifested by the steps of:

performing a measurement of the effective radius $R_S$ of at least one grinding wheel of the grinding machine at least once during the machining of each gear tooth flank; and reducing the grinding stroke H in relation to a gradual reduction of the active radius $R_S$ detected by said measurement.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIG. 1a is a schematic plan view of the gear tooth space of a helical gear;

FIG. 1b is a schematic elevation of the gear of FIG. 1a;

FIG. 2 is schematic diagram of a conjugate generating profile normal to the helical gear tooth space;

BRIEF DESCRIPTION OF THE PREFERRED EMBODIMENTS

Figure 3A:
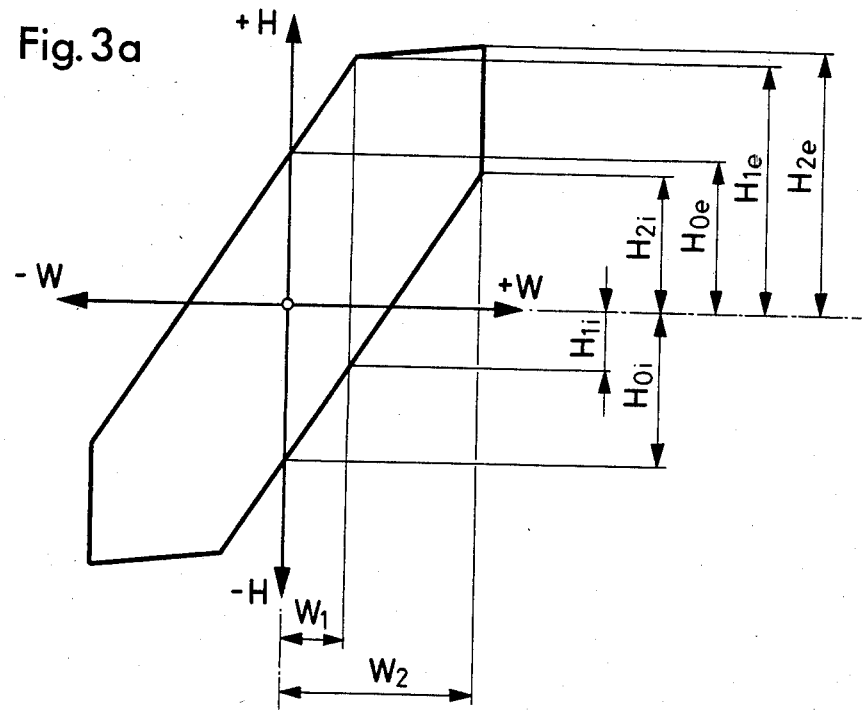
FIGS. 3a and 3b are schematic diagrams simulating the active grinding zone of helical gear teeth.

Describing now the drawings, it is to be understood that to simplify the showing of the drawings, only enough of of the drawings have been illustrated therein as is needed to enable one skilled in the art to readily understand the underlying principles and concepts of this invention.

In the following, the invention and its mathematical basis will be described in relation to a gear tooth flank grinding machine having two grinding wheels whose wheel rims are in grinding contact with the flanks 1 and 2 of the gear teeth 3 to be machined or generated. The flank of a standard basic rack tooth profile representing the plane in which such dished grinding wheel rim contacts the flank 1 or 2 of a tooth 3 of a gear 4 will be assumed as an analogy for the development of the mathematical relationships.

FIGS. 1a and 1b show the central point O of the gear wheel 4 to be ground, the generation point or pitch point W and the symmetry point M of the grinding wheels in their spatial relationship. When the center or central point O of the gear wheel 4, the pitch or generation point W and the grinding wheel symmetry point M are mutually aligned and the grinding wheel symmetry point M is also in the middle of the gear wheel width b, a symmetrical relationship between the generating path or travel ($\pm W$) and the grinding path or stroke ($\pm H$) exists.

This symmetrical relationship is established for each gear blank 4 to be ground on the gear tooth flank grinding machine by positioning the grinding wheel symmetry point M in the middle of the gear wheel width b as follows: at the correspondingly adjusted tooth height, the grinding wheels are rolled into the gear wheel 4 to be machined from one side and are rolled out on the other side. When one of the grinding wheels first touches one of the gear tooth flanks 1 or 2, the position in the generating path or travel is noted and the corresponding position is noted when the other grinding wheel just ceases to touch the other gear tooth flank. The average of both noted positions represents the symmetry position or point with respect to the generating path or travel W.

FIG. 2 shows a portion 5 of the standard basic rack tooth profile in normal or perpendicular section which forms the basis for the calculation of the grinding stroke limits as a function of the generating path or travel W. The line or chord connecting the two tooth top land edge points $A_1$ and $A_2$ of the standard basic rack tooth profile is designated as the top land line and is tangent to the grinding root or bottom circle (root or bottom diameter $d_{fs}$). These two gear tooth top land points $A_1$ and $A_2$ conjointly with respective gear tooth root points $B_1$ and $B_2$ each define a gear tooth flank 1' and 2', respectively. The grinding root or bottom circle diameter $d_{fs}$ is an input value or variable chosen such that, in grinding, the active flank profile is swept over or covered with a certain over-run or supplement.

The top land width $2.L_F$ of the tool standard basic rack tooth profile can also be determined from the generating data, i.e. from the determining or defining values of the gear wheel 4 including the practical or working basic tangent length $AW_k$ and the already determined grinding root or bottom circle diameter $d_{fs}$.

The following input values are for the calculation of the grinding stroke limit points, i.e. the positioning of the grinding wheels;

| | |
|---|---|
| Module (module normal to helix angle) | $m_n$ |
| Standard pressure angle | $\alpha_t$ |
| Standard pressure angle normal to gear axis | $\alpha_a$ |
| Number of teeth | z |
| Helix angle | $\beta$ |
| Tooth tip or addendum diameter | $d_a$ |
| Base circle diameter | $d_b$ |
| Tooth width | b |
| Grinding root circle diameter | $d_{fS}$ |
| Pitch circle diameter | d |
| Tool addendum depth coefficient for module 1 | $h_{aP}$ |
| Tool dedendum depth coefficient for module 1 | $h_{fS}$ |
| Addendum modification coefficient | x |
| Whole depth of the tool standard basic rack tooth profile | $h_S$ |

A parameter supplied by the grinding machine as a feedback value is:

Radius of the grinding rim of the grinding wheel $R_S$.

The following auxiliary variables or values are employed in the basically well known geometry of gears and are explained in the Maag Gear Book published by the assignee of the present invention in Zürich in 1963:

$$d = \frac{z \cdot m}{\cos\beta}$$

$$\tan\alpha_t = \frac{\tan\alpha}{\cos\beta}$$

$$d_b = d \cdot \cos\alpha_t$$

$$\cos\alpha_a = \frac{d_b}{d_a}$$

$$\tan\gamma = \sin\alpha \cdot \tan\beta$$

$$L_F = 0.5 \left( (K+1) \cdot \pi \cdot m - \frac{AW_k}{\cos\alpha} + z \cdot m \cdot \text{inv}\alpha_t - (d - d_{fs})\tan\alpha \right)$$

$$h_S = 0.5(d_b(\tan\alpha_a - \tan\alpha_t)\sin\alpha_t + d - d_{fs})$$

$$\zeta_0 = L_F \cdot \tan\beta$$

$$\eta_0 = \left( \frac{d - d_{fs}}{2} - L_F \cdot \tan\alpha \right) \cos\alpha$$

$$Q_{20} = 0.5 \frac{b}{\cos\beta} + \zeta_0 + h_s \frac{\tan\gamma}{\cos\alpha}$$

$$Q_{21} = 0.5 \frac{b}{\cos\beta} - \zeta_0 - h_s \frac{\tan\gamma}{\cos\alpha}$$

$$Q_{22} = \frac{\frac{h_s}{\cos\alpha} - \eta_0}{\tan\gamma}$$

$$Q_{23} = \left( R_s^2 - \left( R_s - \frac{h_s}{\cos\alpha} \right)^2 \right)^{\frac{1}{2}}$$

$$Q_{24} = (Q_{21} - Q_{22}) \cdot \sin\gamma$$

$$Q_{25} = Q_{20} \cdot \sin\gamma + \left( \frac{h_s}{\cos\alpha} - \eta_0 \right) \cos\gamma$$

Figure 3B:
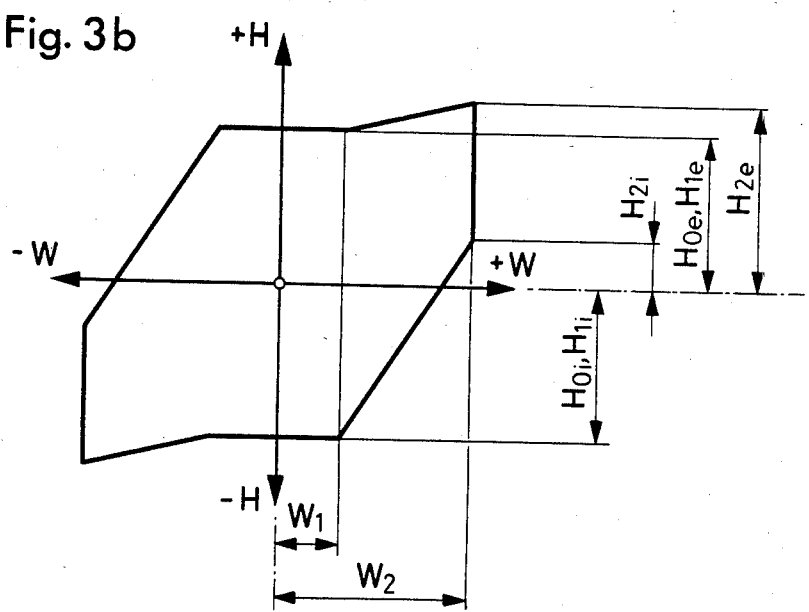

When determining the relation of the grinding stroke to the generation path or travel, the width to be machined of the tooth 3 of the gear 4 is a determining factor. To a good approximation one can assume that for a given left or right handedness of a gear to be machined there arise two simulation diagram types, A and B, as is indicated in FIGS. 3a and 3b. The form of these typical diagrams is exactly determined only at the corner points. The lines or chords connecting these corner points are, for the sake of simplicity, shown as straight lines. In practice, the required approximation function (parabola, hyperbola) must be determined for these connecting lins and adapted to the actual generation path-grinding stroke diagrams.

Figure 6:
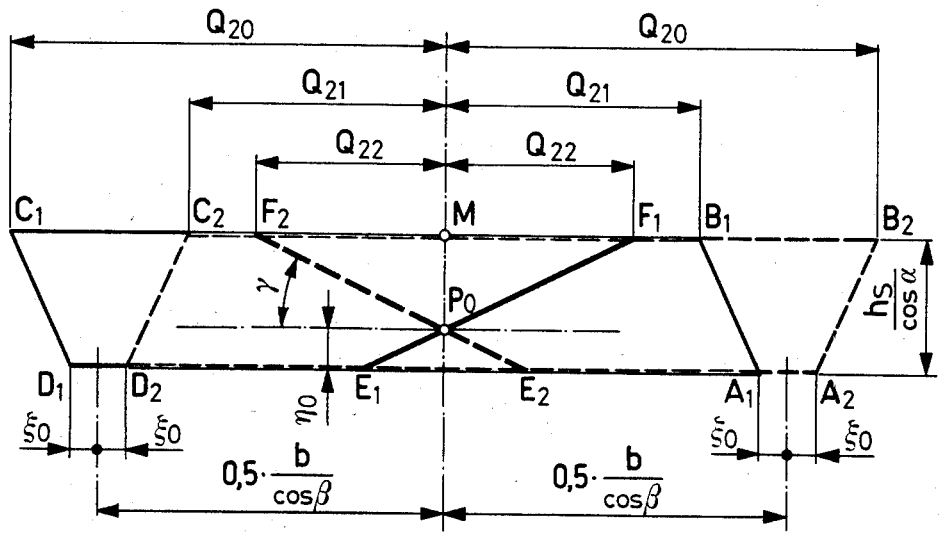
FIG. 6 is a schematic diagram in which the representations of the gear tooth flanks of FIG. 5 have been superimposed.

According to FIG. 6 the diagram type A (FIG. 3a) is applicable when $Q_{21} > Q_{22}$ and Diagram Type B (FIG. 3b) is applicable when $Q_{22} > Q_{21}$.

The associated critical tooth width b' is determined as follows:

$$b' = 2 \cdot \cos\beta \left[ \frac{\frac{h_s}{\cos\alpha} - \eta_0}{\tan\gamma} + \zeta_0 + h_s \frac{\tan\gamma}{\cos\alpha} \right]$$

The diagrams are point-symmetrical about the center position, i.e. about the zero point of calculation for the grinding stroke H and the generation path or travel W. H and W appear in the calculation with an algebraic sign relative to this zero point of calculation. The analogy between a left handed and a right handed gear wheel is mirror symmetry.

For calculation it is sufficient, as will be proved below, to calculate three value pairs for the grinding stroke H and the generation path or travel W for each side. The diagram can then be completed by making the other side symmetrical thereto.

The values themselves are to be calculated for the center position, the positions at the bends of the diagonal lines and the positions of extreme value. This calculation will be further investigated below. Unsigned values of the grinding stroke H and the generation path or travel W, i.e. values thereof without an algebraic sign, can each be obtained by the superposition of a constant value.

Figure 4:
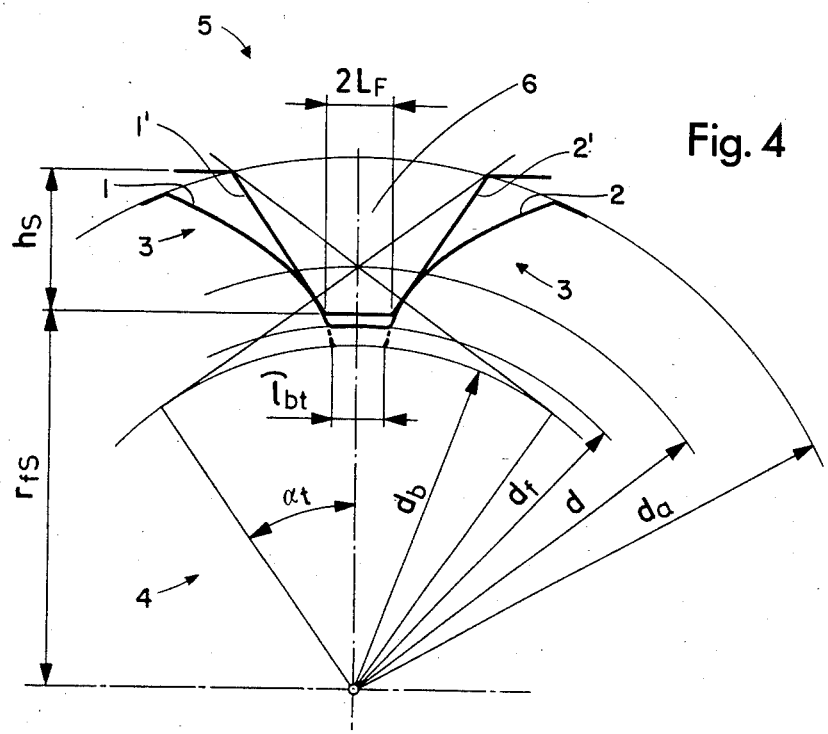
FIG. 4 is a schematic representation of an actual gear tooth space corresponding to FIG. 2.

On the basis of the parameters determined by the auxiliary variables or values, as they were defined further above, the following equations can be set up for the value pairs corresponding to the diagrams A and B:

Diagram Type A (see FIG. 3a)
$W_0 = 0$: $\quad H_{0i} = -(Q_{22} + Q_{23})$
$\quad\quad\quad\quad H_{0e} = +(Q_{22} + Q_{23})$ $W_1 = \dfrac{Q_{24}}{\sin\alpha_t}$: $\quad H_{1i} = \dfrac{Q_{24}}{\sin\gamma} - (Q_{22} + Q_{23})$ $\quad\quad\quad\quad\quad\quad H_{1e} = \dfrac{Q_{24}}{\sin\gamma} + (Q_{22} + Q_{23})$ $W_2 = \dfrac{Q_{25}}{\sin\alpha_t}$: $\quad H_{2i} = Q_{20} - Q_{23}$ $\quad\quad\quad\quad\quad\quad H_{2e} = Q_{20} + Q_{23}$ Diagram Type B (see FIG. 3b)
$W_0 = 0$: $\quad H_{0i} = -(Q_{21} + Q_{23})$
$\quad\quad\quad\quad H_{0e} = +(Q_{21} + Q_{23})$ $W_1 = (Q_{22} - Q_{21})\dfrac{\sin\gamma}{\sin\alpha_t}$ : $H_{1i} = -(Q_{21} + Q_{23})$ $\quad\quad\quad\quad\quad\quad\quad\quad\quad H_{1e} = +(Q_{21} + Q_{23})$ $W_2 = \dfrac{Q_{25}}{\sin\alpha_t}$ : $\quad H_{2i} = Q_{20} - Q_{23}$ $\quad\quad\quad\quad\quad\quad H_{2e} = Q_{20} + Q_{23}$ A practically realistic tooth space 6 corresponding to the schematic representation of FIG. 2 is illustrated in FIG. 4. It is to be imagined that the grinding wheels machine the chords $A_1B_1$ and $A_2B_2$. Distance $A_1A_2$ is adjusted or set up on the grinding machine according to a pre-calculated value.

Figure 5:
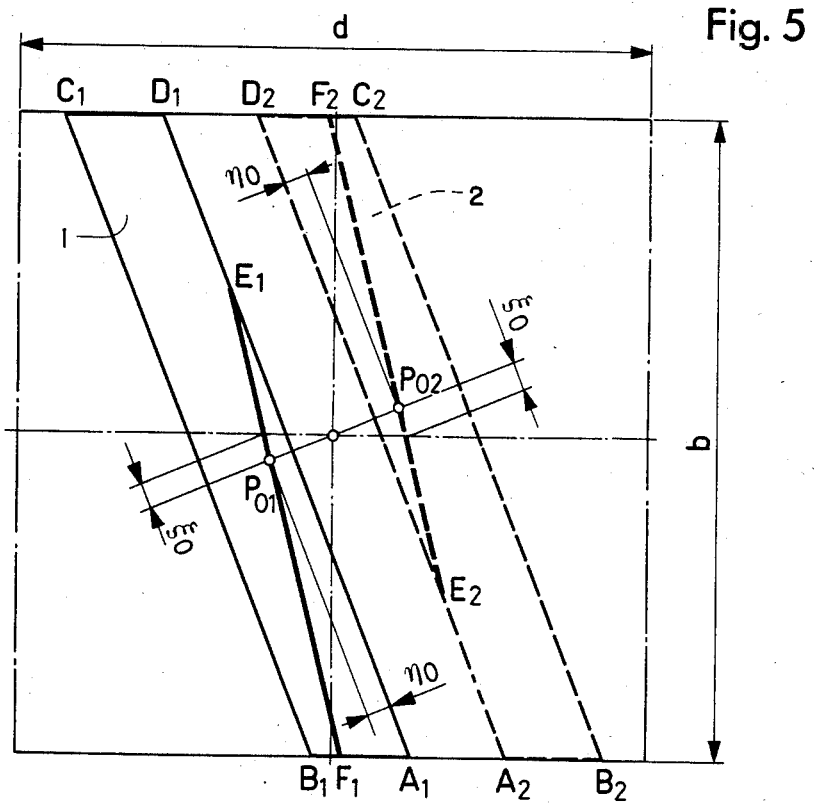
FIG. 5 is a schematic diagram corresponding to a plan view of the gear tooth space of FIG. 4.

The mathematical determination of the distance $A_1A_2$ is given below, proceeding from the machined tooth width $AW_k$ and the grinding root circle diameter $d_{fS}$:

$1_{bn} = 2_{Pbn} - (AW_k - (k - 1) \cdot P_{bn}) = (k + 1)P_{bn} - AW_k$ $1_{bt} = \dfrac{1_{bn}}{\cos\beta_b}$ $1_t = d\left(\dfrac{1_{bt}}{d_b} + inv\alpha_t\right)$ $1_n = 1_t \cdot \cos\beta = d \cdot \cos\beta \left(\dfrac{1_{bt}}{d_b} + inv\alpha_t\right)$ $1_n = \dfrac{z \cdot m}{\cos\beta} \cdot \cos\beta \left(\dfrac{1_{bt}}{d_b} + inv\alpha_t\right) = z \cdot m \left(\dfrac{1_{bt}}{d_b} + inv\alpha_t\right)$ $= z \cdot m \left(\dfrac{(k + 1)P_{bn} - AW_k}{\cos\beta_b \cdot d_b} + inv\alpha_t\right)$ $= z \cdot m \left(\dfrac{(k + 1) \cdot \pi \cdot m \cdot \cos\alpha - AW_k}{z \cdot m \cdot \cos\alpha}\right) + z \cdot m \cdot inv\alpha_t$ $= \pi \cdot m(k + 1) - \dfrac{AW_k}{\cos\alpha} + z \cdot m \cdot inv\alpha_t$ $2L_f = 1_n - \dfrac{d - d_{fs}}{2} \cdot 2 \cdot \tan\alpha$ $L_f = 0{,}5 \left((k + 1) \cdot \pi \cdot m - \dfrac{AW_k}{\cos\alpha} + z \cdot\right.$ $\left. m \cdot inv\alpha_t - (d - d_{fs})\tan\alpha \right)$ The graphical determination of the line of contact of the tool standard basic rack tooth profile on the gear tooth flanks 1 and 2 is shown in FIG. 5. The projection or intersection points of the normals to the gear tooth flanks 1 and 2 from the pitch point or generation point of the symmetry position are designated as $P_{01}$ and $P_{02}$.

The individual peripheries or circumferences define:

| | |
|---|---|
| $A_1 B_1 C_1 D_1$ | Tool tooth flank profile 1 |
| $A_2 B_2 C_2 D_2$ | Tool tooth flank profile 2 |
| $E_1 F_1$ | Contact line of flank 1 |
| $E_2 F_2$ | Contact line of flank 2 |
| $A_1 D_1$ | Root line of flank 1 |
| $A_2 D_2$ | Root line of flank 2 |

Both flanks are represented in FIG. 6 superimposed upon one another so that both points $P_{01}$ and $P_{02}$ are congruent at the common point $P_0$.

During profile generation, the contact line $E_1 F_1$ is displaced parallel to itself upwardly and the contact line $E_2 F_2$ is displaced parallel to itself downwardly or vice versa according to direction of generation, i.e. the crossing point of the contact lines in FIG. 6 moves horizontally along a line through $P_0$ to the left or to the right according to the direction of generation.

Since the grinding stroke and generation path or travel relationships are symmetrical about the central position of the upward and downward grinding stroke H and the leftward and rightward generation path or travel W, as mentioned before, it is sufficient to perform the calculation for one side only. The diagram or diagrams are therefore point-symmetrical in relation to the frame of reference of the calculations.

Figure 7:
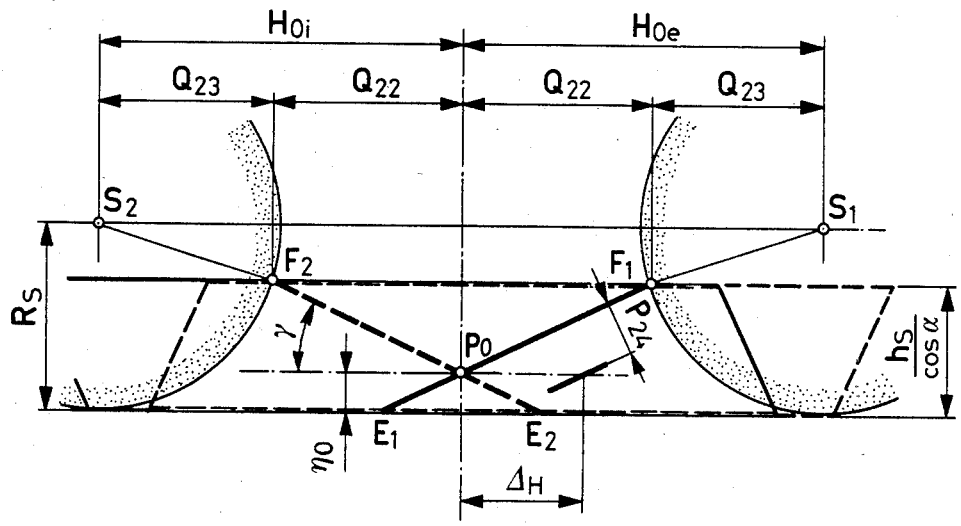
FIGS. 7 through 12 are further diagrams analogous to FIG. 6 and depicting various conditions of operation.
Figure 8:
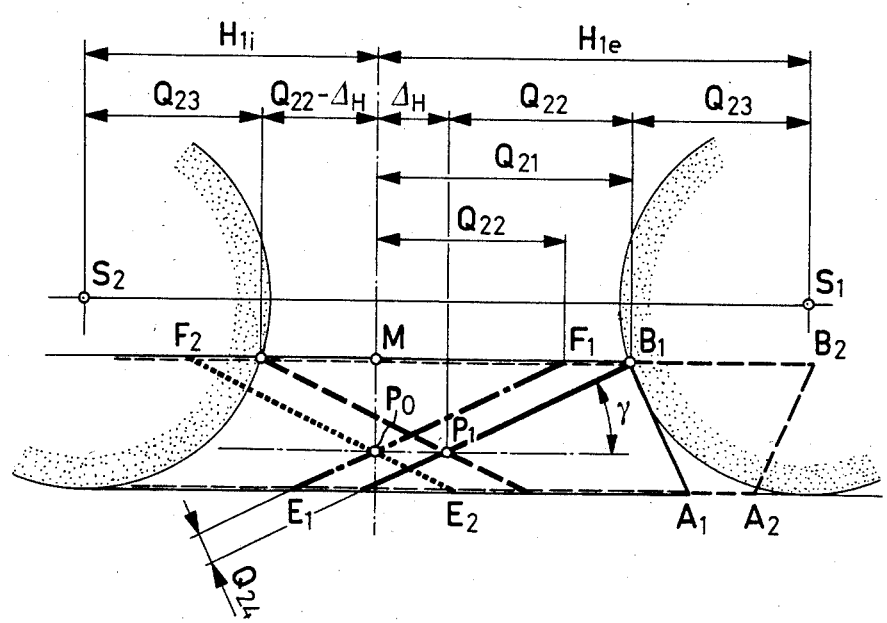
Figure 9:
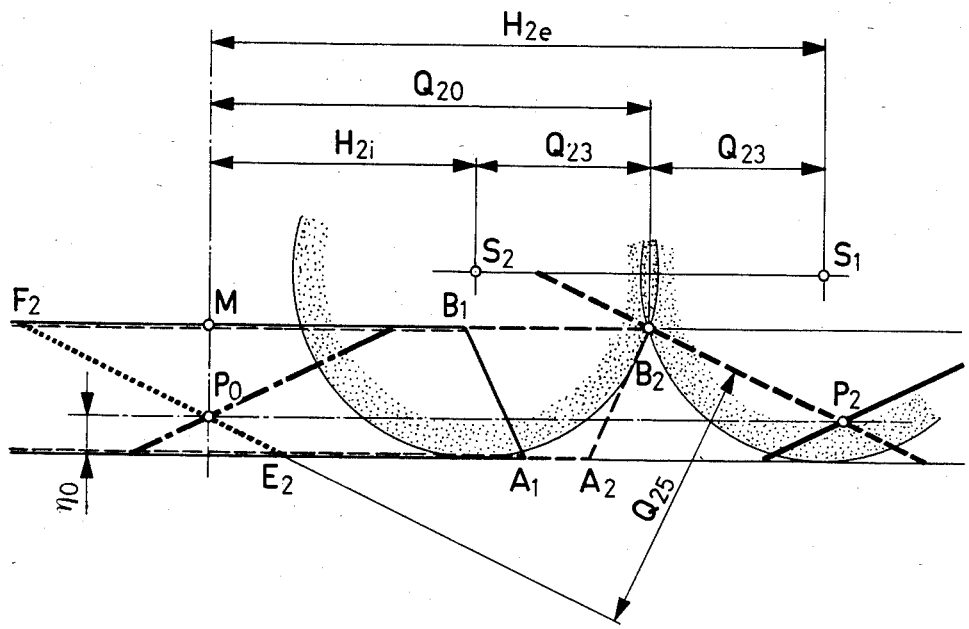

The value pairs summarized in FIGS. 7, 8 and 9 for the Diagram Type A can now be determined:

FIG. 7 describes the case in which the generation path or travel W is equal to zero and in which the gear mesh is of unlimited width. In this so called central position, the following condition for the limits of the grinding stroke exist:

$$H_{0i} = -(Q_{22} + Q_{23})$$

$$H_{0e} = +(Q_{22} + Q_{23})$$

FIG. 8 shows the case in which a generation point or position is reached corresponding to a bending point in a border line of the grinding stroke/generation path simulation diagram, the point at which the contact line $E_1 F_1$ passes through the point $B_1$. For this generation path or travel $W_1$, the following grinding stroke limits can be calculated:

$$Q_{24} = (Q_{21} - Q_{22}) \cdot \sin\gamma$$

$$W_1 = \frac{Q_{24}}{\sin\alpha_t}$$

$$\Delta H = \frac{Q_{24}}{\sin\gamma}$$

$$H_{1i} = \Delta H - (Q_{22} + Q_{23})$$

$$H_{1e} = \Delta H + (Q_{22} + Q_{23})$$

FIG. 9 shows the case where the generation point or position is reached which corresponds to the extreme value of the grinding stroke. There the contact line $E_2 F_2$ passes through the point $B_2$ and the generation point or position itself is indicated by $W_2$ in FIGS. 3a and 3b. The grinding wheel contacts the point $B_2$ twice, namely once in its position at $S_1$ and once in its position at $S_2$. In this part of the generation path or travel the contact line $E_1 F_1$ is already far beyond the associated tooth flank.

The following values result in relation to the grinding stroke limits:

$$Q_{25} = Q_{20} \cdot \sin\gamma + \left[ \frac{h_s}{\cos\alpha} - \eta_0 \right] \cos\gamma$$

$$W_2 = \frac{Q_{25}}{\sin\alpha_t}$$

$$H_{2i} = Q_{20} - Q_{23}$$
$$H_{2e} = Q_{20} + Q_{23}$$

Figure 10:
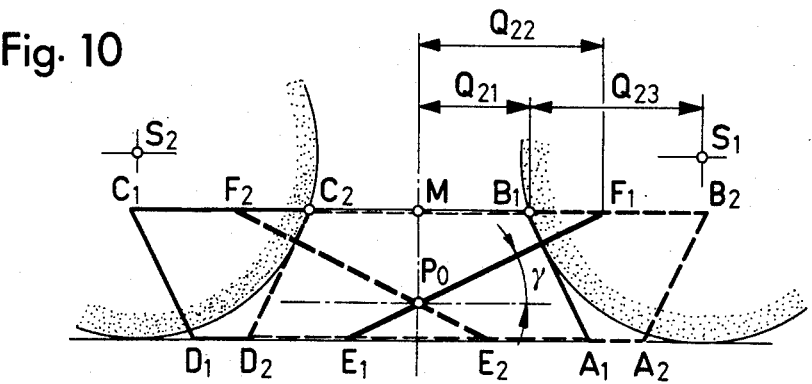

The mathematical development of the relationships for the Diagram Type B are analogous to those for the Diagram Type A. The grinding stroke limits graphically determined in FIGS. 10, 11 and 12 can be calculated as follows:

The generation point or position at $P_0$ (central position) according to FIG. 10:

$$H_{0i} = -(Q_{21} + Q_{23})$$

$$H_{0e} = +(Q_{21} + Q_{23})$$

Figure 11:
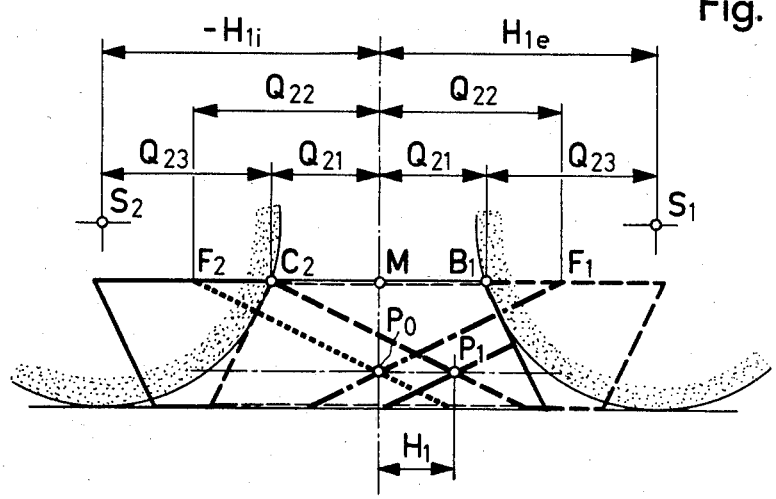

The generation point or position at point $P_1$ which is reached when the contact line $E_2 F_2$ passes through the point $C_2$ according to FIG. 11:

$$W_1 = H_1 \cdot \frac{\sin\gamma}{\sin\alpha_t} = (Q_{22} - Q_{21}) \frac{\sin\gamma}{\sin\alpha_t}$$

This implies that the gear profile at the generation point or position $P_1$ can be ground with the same values of grinding stroke as at point $P_0$:

$$H_{1i} = -(Q_{21} + Q_{23})$$

$$H_{1e} = +(Q_{21} + Q_{23})$$

Figure 12:
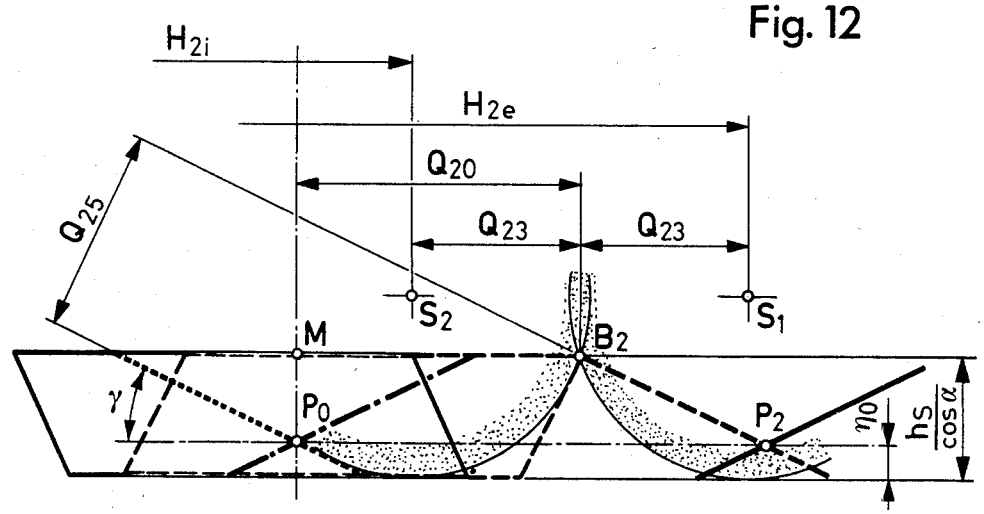

According to FIG. 12, the generation position at $B_2$ is reached when the counter line $E_2 F_2$ passes through the point $B_2$:

$$Q_{25} = Q_{20} \cdot \sin\gamma + \left[ \frac{h_s}{\cos\alpha} - \eta_0 \right] \cos\gamma$$

$$W_2 = \frac{Q_{25}}{\sin\alpha_t}$$

$$H_{2i} = Q_{20} - Q_{23}$$
$$H_{2e} = Q_{20} + Q_{23}$$

A device known from the German Pat. No. 3,132,496 for dressing and resetting a grinding wheel on a gear tooth grinding machine can, for example, be employed for measuring the grinding wheel radius $R_S$. In this known device the grinding wheel or wheels are journaled in a grinding support which can be adjusted or reset in correspondence with the wear of the grinding wheel by means of a stepping motor. The stepping motor is controlled by a control unit which receives signal pulses from a feeler sensing the envelope surface of the grinding wheel. The pulses generated and transmitted by the feeler can be employed to calculate the actually effective grinding wheel radius $R_S$ at any time, assuming a defined initial state.

The grinding stroke H controlled in relation to the grinding wheel radius $R_S$ according to the method of the present invention is augmented or increased by the amount of a constant over-run margin of a few millimeters dependent upon the attainable design precision of the machine in order that the gear tooth flanks be fully machined or ground under all conditions. Such overrun margin, however, does not alter the basic principle of maintaining the grinding stroke as small as is possible under the given conditions at all times. One of such conditions is the unpredictable value of the gradually decreasing grinding wheel radius $R_s$ due to wear and redressing.

During rough grinding operations, the measurement of the grinding wheel radius $R_s$ and the corresponding control of the grinding stroke H in relation thereto are performed from 10 to 100 times per tooth flank. During finish grinding, the corresponding operations are performed from 1 to 10 times per tooth flank.

The minimization of the grinding stroke H according to the present invention permits considerable time savings which can be further increased by regulating the generation speed or velocity of generation travel such that it increases as the grinding stroke decreases and vice versa, assuming a substantially constant velocity of the grinding strokes themselves.

While there are shown and described present preferred embodiments of the invention, it is to be distinctly understood that the invention is not limited thereto, but may be otherwise variously embodied and practiced within the scope of the following claims. Accordingly,

What we claim is:

1. A method for controlling a grinding stroke (H) of a gear tooth flank grinding machine operating on an indexing generating principle and having at least one dished grinding wheel with an effective radius ($R_S$) reciprocatably movable in grinding strokes along generatrices of involute gear tooth flanks to perform a machining of each such gear tooth flank and wherein a grinding stroke (H) is greater than lengths of the generatrices by the amount of a supplemental dimension, comprising the steps of:
   performing a measurement of said effective radius ($R_S$) of said at least one grinding wheel at least once during said machining of each gear tooth flank; and
   reducing said grinding stroke (H) of said at least one grinding wheel in correspondence to a gradual reduction of said effective radius ($R_S$) detected by said measurement.

2. The method as defined in claim 1, comprising the steps of:
   repeating said measurement of said effective radius ($R_S$) of said at least one grinding wheel and said reducing of said grinding stroke (H) at least 10 times on each tooth when performing said machining as a rough machining operation.

3. The method as defined in claim 1, comprising the steps of:
   repeating said measurement of said effective radius ($R_S$) of said at least one grinding wheel and said reducing of said grinding stroke (H) of said at least one grinding wheel at most 100 times on each tooth when performing said machining as a rough machining operation.

4. The method as defined in claim 1, comprising the steps of:
   repeating said measurement of said effective radius ($R_S$) of said at least one grinding wheel and said reducing of said grinding stroke (H) of said at least one grinding wheel at least once on each tooth when performing said machining as a finish machining operation.

5. The method as defined in claim 1, comprising the steps of:
   repeating said measurement of said effective radius ($R_S$) of said at least one grinding wheel and said reducing of said grinding stroke (H) of said at least one grinding wheel at most 10 times on each tooth when performing said machining as a finish machining operation.

6. The method as defined in claim 1, for controlling said grinding stroke (H) in relation to a generating travel (W) when grinding helical gear teeth, comprising the steps of: defining limits of the grinding stroke (H) according to the following formulae:

When $Q_{21}$ is greater than $Q_{22}$:

$$W_0 = 0: \quad \begin{aligned} H_{0i} &= -(Q_{22} + Q_{23}) \\ H_{0e} &= +(Q_{22} + Q_{23}) \end{aligned}$$

$$W_1 = \frac{Q_{24}}{\sin\alpha_t}: \quad H_{1i} = \frac{Q_{24}}{\sin\gamma} + (Q_{22} + Q_{23})$$

$$H_{1e} = \frac{Q_{24}}{\sin\gamma} - (Q_{22} + Q_{23})$$

$$W_2 = \frac{Q_{25}}{\sin\alpha_t}: \quad H_{2i} = Q_{20} - Q_{23}$$

$$H_{2e} = Q_{20} + Q_{23}$$

When $Q_{21}$ is less than or equal to $Q_{22}$:

$$W_0 = 0: \quad \begin{aligned} H_{0i} &= -(Q_{21} + Q_{23}) \\ H_{0e} &= +(Q_{21} + Q_{23}) \end{aligned}$$

$$W_1 = (Q_{22} - Q_{21})\frac{\sin\gamma}{\sin\alpha_t}: \quad H_{1i} = -(Q_{21} + Q_{23})$$

$$H_{1e} = +(Q_{21} + Q_{23})$$

$$W_2 = \frac{Q_{25}}{\sin\alpha_t}: \quad H_{2i} = Q_{20} - Q_{23}$$

$$H_{2e} = Q_{20} + Q_{23}$$

Where for both cases:

$$Q_{20} = 0.5\frac{b}{\cos\beta} + \zeta_0 + h_s\frac{\tan\gamma}{\cos\alpha}$$

$$Q_{21} = 0.5\frac{b}{\cos\beta} - \zeta_0 - h_s\frac{\tan\gamma}{\cos\alpha}$$

$$Q_{22} = \frac{\frac{h_s}{\cos\alpha} - \eta_0}{\tan\gamma}$$

$$Q_{23} = \sqrt{R_s^2 - \left(R_s - \frac{h_s}{\cos\alpha}\right)^2}$$

$$Q_{24} = (Q_{21} - Q_{22}) \cdot \sin\gamma$$

$$Q_{25} = Q_{20} \cdot \sin\gamma + \left[\frac{h_s}{\cos\alpha} - \eta_0\right]\cos\gamma$$

$$\xi_0 = L_F \cdot \tan\beta$$

$$\eta_0 = \left[\frac{d - d_{fs}}{2} - L_F \cdot \tan\alpha\right]\cos\alpha$$

$$L_f = 0.5\left[(k+1) \cdot \pi \cdot m - \frac{AW_k}{\cos\alpha} + z \cdot \right.$$

$$\left. m \cdot \text{inv}\alpha_t - (d - d_{fs})\tan\alpha\right]$$

$$h_S = 0.5[d_b(\tan\alpha_a - \tan\alpha_t)\sin\alpha_t + d - d_{fs}]$$

$$\tan\gamma = \sin\alpha \cdot \tan\beta$$

wherein:

$Q_{20}$ = a distance from a symmetry point of the at least one grinding wheel to a most remote extreme grinding point on a flank of a tooth of the gear;

$Q_{21}$ = a distance from a symmetry point of the at least one grinding wheel to a least remote extreme grinding point on a flank of a tooth of the gear;

$Q_{22}$ = a distance from a symmetry point of the at least one grinding wheel to a grinding point at a top edge of a tooth of the gear;

$Q_{23}$ = a component of an effective grinding radius of the at least one grinding wheel in a direction of a length of a tooth of the gear;

$Q_{24}$ = a distance of a generation line from a generation line passing through a least remote extreme grinding point on a flank of a tooth of the gear;

$Q_{25}$ = a distance of a generation line passing through a most remote extreme grinding point of a flank of a tooth of the gear from a generation line passing though a point where a normal from the symmetry point of the at least one grinding wheel intersects the flank of the tooth of the gear;

$W_0$ = a position of a generating travel at a grinding point at the pitch point of the gear;

$W_1$ = a position of a generating travel at a least remote grinding point of a flank of a tooth of the gear;

$W_2$ = a position of a generating travel at a most remote grinding point of a flank of a tooth of the gear;

$H_{0i}$ = a distance of an initial point of a grinding stroke defined by a top edge of a first tooth of the gear corresponding to the generating travel $W_0$ from a symmetry point of the at least one grinding wheel;

$H_{0e}$ = a distance of a final point of a grinding stroke defined by a top edge of a further tooth of the gear corresponding to the generating travel $W_0$ from a symmetry point of the at least one grinding wheel;

$H_{1i}$ = a distance of an initial point of a grinding stroke defined by a top edge of a first tooth of the gear corresponding to the generating travel $W_1$ from a symmetry point of the at least one grinding wheel;

$H_{1e}$ = a distance of a final point of a grinding stroke defined by a top edge of a further tooth of the gear corresponding to the generating travel $W_1$ from a symmetry point of the at least one grinding wheel;

$H_{2i}$ = a distance of an initial point of a grinding stroke defined by a top edge of a first tooth of the gear corresponding to the generating travel $W_2$ from a symmetry point of the at least one grinding wheel;

$H_{2e}$ = a distance of an final point of a grinding stroke defined by a top edge of a further tooth of the gear corresponding to the generating travel $W_2$ from a symmetry point of the at least one grinding wheel;

$\gamma$ = a lead angle of a helical tooth of the gear;

$\alpha_t$ = a transverse pressure angle of the gear;

$\alpha_a$ = a normal pressure angle of the gear;

$\beta$ = a helix angle of a tooth of the gear;

$\eta_0$ = a distance of a grinding point on a flank of a tooth of the gear corresponding to a symmetry position of the at least one grinding wheel from a midpoint of a length of the flank of the tooth of the gear;

$\xi_0$ = a distance of a grinding point on a flank of a tooth of the gear corresponding to a symmetry position of the at least one grinding wheel from a root line of the flank of the tooth of the gear;

$\pi$ = a numerical constant equal to 3.141596 . . .

$b$ = a width of a tooth of the gear in a direction parallel to a central axis of the gear;

$d$ = a pitch circle diameter of the gear;

$d_b$ = a base circle diameter of the gear;

$d_{fS}$ = a grinding root circle diameter of the gear;

$h_s$ = a whole depth of a tooth of a tool standard basic rack tooth profile of the gear;

$k$ = a number of teeth of the gear in a subset of the total number of teeth of the gear;

$m$ = a module of the gear which is the same as the inverse value of a diametrical pitch of the gear;

$Z$ = a total number of teeth of the gear;

$AW_k$ = a basic tangential length of the gear measured over k number of teeth;

$L_F$ = half of a normal top land width of a tooth of the gear;

$R_S$ = an effective grinding radius of the at least one grinding wheel.

* * * * *

UNITED STATES PATENT AND TRADEMARK OFFICE
CERTIFICATE OF CORRECTION

PATENT NO. : 4,551,954
DATED : November 12, 1985
INVENTOR(S) : Peter Bloch et al It is certified that error appears in the above—identified patent and that said Letters Patent is hereby corrected as shown below:

Column 8, line 24, please delete "counter" and insert --contact--

Signed and Sealed this

Fourth Day of March 1986

[SEAL]

Attest:

DONALD J. QUIGG

Attesting Officer

Commissioner of Patents and Trademarks